United States Patent
Xu et al.

(10) Patent No.: US 11,841,599 B2
(45) Date of Patent: Dec. 12, 2023

(54) APPARATUS OF OPTICAL TRANSMITTERS AND RECEIVERS OPERATING IN LONG WAVE INFRARED WAVELENGTH RANGES

(71) Applicant: McMaster University, Hamilton (CA)

(72) Inventors: Chang-qing Xu, Dundas (CA); Liam Flannigan, Hamilton (CA); Joshua Kneller, Hamilton (CA)

(73) Assignee: McMaster University, Ontario (CA)

( * ) Notice: Subject to any disclaimer, the term of this patent is extended or adjusted under 35 U.S.C. 154(b) by 0 days.

(21) Appl. No.: 17/451,711

(22) Filed: Oct. 21, 2021

(65) Prior Publication Data
US 2022/0197109 A1 Jun. 23, 2022

Related U.S. Application Data

(60) Provisional application No. 63/094,465, filed on Oct. 21, 2020.

(51) Int. Cl.
*G02F 1/39* (2006.01)
*G02F 1/35* (2006.01)
(Continued)

(52) U.S. Cl.
CPC .............. *G02F 1/39* (2013.01); *G02F 1/3534* (2013.01); *G02F 1/3548* (2021.01); *H01S 3/109* (2013.01); *H01S 3/1083* (2013.01)

(58) Field of Classification Search
CPC ........ G02F 1/3534; G02F 1/3548; G02F 1/39; H01S 3/109
See application file for complete search history.

(56) References Cited

U.S. PATENT DOCUMENTS

| | | | |
|---|---|---|---|
| 5,333,142 A | 7/1994 | Scheps | |
| 5,923,452 A | 7/1999 | Carlson | |
| (Continued) | | | |

FOREIGN PATENT DOCUMENTS

| | | |
|---|---|---|
| CN | 102324962 B | 4/2014 |
| CN | 104410463 A | 3/2015 |
| (Continued) | | |

OTHER PUBLICATIONS

Mikolajczyk et al., "Analysis of Free-Space Optics Development", Metrology and Measurement Systems. vol. 24, No. 4, pp. 653-674. 2017.
(Continued)

*Primary Examiner* — Daniel Petkovsek
(74) *Attorney, Agent, or Firm* — Bereskin & Parr LLP (57) ABSTRACT

Optical transmitters and optical receivers utilizing long wave infrared light for use with an earth-orbiting satellite communication system, and a structure including an intra-cavity optical nonlinear process, are described herein. The transmitters include a pumping laser diode with a fast-axis collimating lens and a pumping wavelength λ0, operating in a continuous wavelength (CW) mode. The transmitters also include a laser cavity having a beam combiner or a dichroic mirror, a laser crystal with a lasing wavelength λ1 and a
(Continued)

difference frequency generation orientation patterned semiconductor to generate long wave-IR light. The transmitters also include a second laser at a wavelength λ2, operating in a modulation mode. The receivers have a similar structure to the transmitters, utilizing a sum frequency generation orientation patterned semiconductor to convert long wave-IR light into the short wave-IR.

9 Claims, 9 Drawing Sheets

(51) Int. Cl.
*H01S 3/109* (2006.01)
*H01S 3/108* (2006.01)

(56) References Cited

U.S. PATENT DOCUMENTS

| | | | |
|---|---|---|---|
| 6,256,327 B1* | 7/2001 | Goldberg | G02F 1/3534 372/98 |
| 6,919,985 B2* | 7/2005 | Furukawa | G02F 1/3534 359/326 |
| 9,001,853 B2* | 4/2015 | Kane | H01S 3/1083 372/21 |
| 9,086,609 B1 | 7/2015 | Yan et al. | |
| 9,231,373 B2* | 1/2016 | Fallahi | H01S 5/4087 |
| 2001/0012142 A1 | 8/2001 | Carlson | |
| 2002/0181059 A1 | 12/2002 | Christopher | |
| 2004/0208602 A1 | 10/2004 | Plante | |
| 2012/0281741 A1 | 11/2012 | Feher | |

FOREIGN PATENT DOCUMENTS

| | | |
|---|---|---|
| CN | 106533562 A | 3/2017 |
| EP | 0054582 B1 | 3/1986 |
| EP | 0989692 B1 | 3/2000 |
| EP | 1097530 B1 | 5/2006 |

OTHER PUBLICATIONS

Islam et al., "Effect of Operating Wavelengths and Different Weather Conditions on Performance of Point-to-Point Free Space Optical Link", International Journal of Computer Networks & Communications (IJCNC). vol. 8, No. 2. Mar. 2018.
Leitgeb et al., "Analysis and Evaluation of Optimum Wavelengths for Free-Space Optical Transceivers", International Conference on Transparent Optical Networks (ITCON). 2010.
Chen, "Attenuation of Electromagnetic Radiation by Haze, Fog, Clouds, and Rain", Rand Corporation, Santa Monica, 1975.
Carrier et al., "The Backscattering and Extinction of Visible and Infrared Radiation by Selected Major Cloud Models", Applied Optics, vol. 6, No. 7, p. 1209, 1967. Available: 10.1364/ao.6.001209.
Arnulf et al., "Transmission by Haze and Fog in the Spectral Region 0.35 to 10 Microns*", Journal of the Optical Society of America, vol. 47, No. 6, p. 491, 1957. Available: 10.1364/josa.47.000491.
Lynch et al., "Growth of mm-thick orientation-patterned GaAs for IR and THZ generation", Journal of Crystal Growth, vol. 310. 2008.
Koh et al., "GaAs/Ge/GaAs Sublattice Reversal Epitaxy on GaAs (100) and (111) Substrates for Nonlinear Optical Devices", Japanese Journal of Applied Physics, vol. 2, pp. 508-511. May 1999.
Minor et al., "Mirrorless optical parametric oscillation in bulk PPLN and PPLT: a feasibility study", Appl. Phys. B. 2017. doi: 10.1007/s00340-016-6602-x.
Canalias et al., "Mirrorless optical parametric oscillator", Nature Photon 1, 459-462 (2007). https://doi.org/10.1038/nphoton.2007.13.

* cited by examiner

APPARATUS OF OPTICAL TRANSMITTERS AND RECEIVERS OPERATING IN LONG WAVE INFRARED WAVELENGTH RANGES

CROSS-REFERENCE TO RELATED APPLICATIONS

The present application claims the benefit of U.S. Provisional Patent Application No. 63/094,465 entitled "APPARATUS OF OPTICAL TRANSMITTERS AND RECEIVERS OPERATING IN LONG WAVE INFRARED WAVELENGTH RANGES" filed on Oct. 21, 2021, the entire contents of which are hereby incorporated by reference herein.

TECHNICAL FIELD

The presented disclosure applies generally to the fields of free space optical communication, nonlinear optics, orientation patterned semiconductors, and lasers. More specifically, the present disclosure describes the use of difference and sum frequency generation in orientation patterned semiconductors to create an optical transmitter and receiver operating in the long wave infrared (LWIR) wavelength range, respectively, for use in optical satellite communication systems. Additionally, a backwards three wave mixing is presented using orientation patterned semiconductors.

BACKGROUND

Satellite technology is an increasingly important part of modern scientific research, and as they have become more common, they have even permeated day-to-day life. An important aspect of satellite technology is the ability to communicate with the satellite, sending and receiving information as necessary. This is often facilitated through the use of radio and microwave telecommunications for telephone, radio, internet, or military applications. However, the use of such systems requires international efforts to allocate the relevant frequency bands under the International Telecommunication Union. Over the past few decades, these communication bands have become increasingly complicated to manage as more satellites are created and launched into orbit. Unfortunately, the longer wavelengths and lower frequencies of radio and microwave communication effectively places a limit on the bandwidth of any communication utilizing these methods. This will prove to be an issue for future space missions, as larger amounts of data will need to be sent to ground stations on Earth for analysis with the advent of increasingly complex missions and payloads.

As we reach the bandwidth limits that microwave and radio communication can provide, recent missions have turned to optical communication as a promising alternative. The significantly shorter wavelengths and higher frequencies of optical radiation (covering the ultraviolet, visible, and infrared spectrums) allow for much higher data rates than other alternatives. There is no better example of this than modern optical fiber-based communication, which is now capable of reaching data rates in the multiple gigabits per second (Gbps) range. However, satellites do not have the luxury of using optical fibers, and instead any optical communications that take place must propagate through free space and Earth's atmosphere instead. This falls under the broad field of free space optical (FSO) communication, which has seen much development recently due to the potential for cutting the cost of laying many miles of fiber by utilizing free space optical systems.

There are a number of light sources that have been used for such communications, but the laser remains one of the most promising candidates for implementing such systems. The high degree of directionality of a laser beam means that the connection is more secure than a typical radio or microwave system, where the propagated signal can spread out to the size of an entire continent by the time the signal reaches the Earth's surface. In contrast, a sufficiently designed laser system is capable of reaching spot sizes on the order of meters. Such systems have been implemented successfully on various missions in the past 25 years (U.S. Pat. No. 5,923,452A, US20010012142A1). Of course, the improved directionality comes at the cost of requiring a much more accurate pointing system versus radio or microwave communication, typically requiring microradian or even sub-microradian pointing accuracy (CN102324962B, EP0989692B1). There are other challenges that must be addressed in order to successfully implement an FSO system, the most pressing of which involves atmospheric attenuation, scintillation, absorption, scattering and other non-ideal optical effects.

The non-ideal optical properties of Earth's atmosphere have led to the development of multiple systems intended on mitigating these effects to better utilize FSO satellite communication. One of the more common approaches is to utilize longer wavelength lasers, as these are less susceptible to Rayleigh and Mie scattering which distort the signal. This also avoids eye safety issues posed by attempting to use visible lasers. These systems typically use wavelengths in the 800 nm (US20120281741A1), 1300 nm and 1500 nm bands (US20020181059A1). While these wavelengths offer acceptable performance in clear weather and rain, they struggle with other forms of weather such as fog. This is due to the fog particles being comparable in size to the transmission wavelengths, increasing Mie scattering. To avoid this, it is desirable to have multiple ground stations and transmitters (CN106533562A, EP1097530B1, EP0054582B1) to act as redundancies in the case that a given ground station has poor weather that limits communication. Another approach is to move to longer wavelengths such as the 3-5 micron mid-infrared window or 8-12 micron long wave infrared window (CN104410463A), which limits scattering further. This is typically accomplished through the use of quantum cascade lasers (US20040208602A1), although attaining the modulation speed or detector response time necessary for high data rates at a reasonable price can be a challenge. As a result, there is a gap in the market than can be filled with a compact, high-power, high-speed transmitter and detector in the long wave infrared range to allow all-weather communication. One potential method which is described within this disclosure involves the use of orientation patterned semiconductors for difference and sum frequency generation, which is a novel approach not seen in this field previously. The concept is similar to the well developed nonlinear photonic crystal-based wavelength conversion (U.S. Pat. No. 5,333,142A), except an orientation patterned semiconductor with higher optical nonlinearity and wider transparency range is used instead. The higher optical nonlinearity should produce higher wavelength conversion efficiencies, while the higher transparency range enables long wave infrared wavelength conversion that is not possible with typical photonic crystals like lithium niobate.

A backwards parametric oscillator is also proposed within using the orientation patterned semiconductors. Backwards parametric oscillation enables higher conversion efficiencies and simplified device designs at the cost of requiring much smaller poling periods that, currently, cannot be obtained in bulk nonlinear photonic crystals unless higher order $3^{rd}$ and $5^{th}$ phase matching is used, lowering the efficiency significantly. Mirrorless oscillation has been demonstrated in waveguides in four wave mixing processes before (U.S. Pat. No. 9,086,609B1), but this will be (to the best of our knowledge) the first demonstration of first order phase matching in a bulk nonlinear material using orientation patterned semiconductors. The theory behind backwards parametric oscillation and the benefits of using orientation patterned semiconductors are explained below.

SUMMARY

The various embodiments described herein generally relate to free space optical communication using long wave infrared light and backwards parametric oscillation. More specifically, the embodiment focuses on the design and optimization of a compact and high-power laser transmitter and receiver capable of a high bit rate that can operate in all weather conditions for optical satellite communication as well as a backwards three wave mixing structure with increased efficiency via orientation patterned semiconductors.

This disclosure provides for an optical transmitter and receiver operating in the long wave infrared wavelength range using a novel nonlinear optics based intracavity design. The system provides compact, lightweight, high power, high bit rate capabilities for sending and receiving information via free space optical communications. This is achieved through the use of an orientation patterned semiconductor designed for difference frequency generation in the case of the transmitter and sum frequency generation for the receiver. This allows the use of two input lasers to generate a third, different wavelength at the output of the device. In the case of the transmitter, a long wave infrared signal in the 8-12 micron band is generated, while the detector converts long wave infrared light into light in telecom wavelength band (such as 1320 nm band) with the help of a second laser to satisfy sum frequency generation requirements.

This disclosure also provides for a backwards three wave mixing capable of generating tunable light across the entire visible, near-, mid- and long wave infrared spectrum (0.4-12 microns) via either difference frequency generation or sum frequency generation. The backwards three wave mixing structure provides higher conversion efficiencies over more common forwards three wave mixing structures, at the cost of requiring much smaller poling periods in the orientation patterned semiconductor versus those typically found in nonlinear photonic crystals. Through the use of orientation patterned semiconductors coupled with modern electron beam lithography and etching techniques, poling periods sufficiently small for efficient backwards three wave mixing (on the order of microns or sub-microns) can be achieved.

The proposed transmitter/receiver described herein is intended to improve the signal up-time/availability for satellite optical communication by using long wave infrared light to avoid the vast majority of atmospheric scintillation, scattering, and other non-ideal optical effects in the communication channel. This is accomplished by generating infrared light in the 8-12 micron atmospheric scintillation band, where transmission is high and Rayleigh and/or Mie scattering that affects shorter wavelengths is minimized. These devices consist of a pumping laser diode with a fast-axis collimating lens, a laser cavity including a dichroic mirror, two lasers of different wavelengths, an orientation patterned semiconductor, and miscellaneous focusing and collimating elements. For the transmitter, amplification of the two input lasers and careful design of the laser cavity and high-speed modulation of one of the input lasers allows for high power, high speed continuous wavelength (CW) laser operation for sending information. In the case of the receiver, a focusing and collimating system such as a telescope gathers the incoming light from the satellite, which is then converted from LWIR to the telecom band where high speed, high sensitivity detectors widely used in the fiber optic telecommunications networks may be used to detect the incoming signal.

The effectiveness of the detector will depend, in part, on the ability to collimate the incoming laser light to a beam diameter of less than 100 microns so that sufficient optical intensity exists for nonlinear optical effects to manifest within the orientation patterned semiconductor.

A transmitter and receiver apparatus for long wave infrared laser light is presented. Alongside it, a backwards three wave mixing structure for sum and difference frequency generation is presented. Various examples of implementations of the transmitter and receiver apparatus are described in the figures and detailed description. The transmitter/receiver is intended to be mounted to an Earth-orbiting satellite or high-altitude communication platform for high speed data transfer. The backwards three wave mixing has applications in quantum optics as a source of entangled photons, all optical telecommunications signal processing, and infrared spectroscopy.

DETAILED DESCRIPTION OF THE DRAWINGS

For a better understanding of the various embodiments described herein, and to show more clearly how these various embodiments may be applied in practice, reference will be made by way of example to the accompanying drawings, which show at least one example embodiment and will now be briefly described.

FIG. 1 is a diagram of the proposed optical transmitter in accordance with an example embodiment. It features the pump laser diode 1 and the optically pumped laser crystal 4, as well as a second laser 8 which will be used with the orientation patterned semiconductor 6 for difference frequency generation of the output light in the long wave infrared range. This is facilitated by the use of a beam combiner 5 to combine lasers one and two prior to the orientation patterned semiconductor 6, as well as miscellaneous focusing 2 and collimating optics. In this example, the first laser beam is completely confined within the laser cavity formed by cavity mirror 3 and mirror 7, and all of the components inside the laser cavity have anti-reflection coatings. A wavelength widely used in fiber optical communication can be used for the second laser 8 so that high speed optical and electric components commercially available on the market can be used.

FIG. 4 is a diagram of the proposed optical receiver in accordance with an example embodiment. The general structure is similar to FIG. 1, with two differences in the laser source 8 for λ2 and that the orientation patterned semiconductor 6 is now designed for sum frequency generation. As this is a receiver, the second laser λ2 is the incoming LWIR light from the satellite communication platform, which is converted to the third wavelength in a telecom band so that high speed and sensitive detectors available on the market can be used. This is then collimated down to a suitable beam width for nonlinear effects to occur with the help of an attached collimating optics 9.

FIG. 7 illustrates the basic concept of backwards three wave mixing. In the diagram, the orientation patterned semiconductor (OP-SC) is used to generate an idler wavelength λi which travels in the opposite horizontal direction of the incident pump λp and signal λs wavelengths. This differs from a typical forward three wave mixing scheme, where the signal, idler, and pump would all be travelling in the same direction. The OP-SC can be designed to facilitate difference or sum frequency generation, and the resulting idler wavelength can be tuned over a wide wavelength range.

FIG. 8 shows a diagram of the proposed backwards three wave mixing in accordance with an example embodiment. It features the pump laser diode 1 and the optical pumped laser crystal 4, as well as a second laser 8 external to the laser cavity which will serve as the signal wavelength with the orientation patterned semiconductor 6 for difference frequency generation over a wide wavelength range. This is facilitated by the use of a beam combiner 5 to combine the pump and signal lasers prior to the orientation patterned semiconductor 6, as well as miscellaneous focusing and collimating optics 2. In this example, having the signal laser 8 and beam combiner 5 external to the cavity minimizes the internal cavity losses, leading to higher conversion efficiencies. The pump and signal lasers can be any laser that produces a suitable wavelength for the intended difference frequency generation, whether it is a diode pumped solid state laser, fiber laser, semiconductor laser diode, VECSEL, quantum cascade laser, or any other form of laser. The beam combiner 5, laser crystal 4, and OP-SC 6 have antireflection coatings to further minimize optical losses.

FIG. 9 shows a similar structure to the backwards three wave mixing proposed in FIG. 8. The main difference is that the orientation patterned semiconductor 6 has been designed for sum frequency generation instead of difference frequency generation. This also results in the anti-reflection coatings targeting the sum frequency wavelength as opposed to the difference frequency wavelength like the design in FIG. 8.

DETAILED DESCRIPTION

In general, an FSO link consists of an optical signal transmitter and receiver. The transmitter is modulated at a high speed, encoding the information to be sent on the optical radiation emitted by the transmitter. The output light is then typically focused through a telescope to facilitate pointing the optical radiation towards the receiver. The receiver typically consists of a series of optical filters to remove background noise, while the signal from the detector is amplified and sent to a demodulator circuit to recover the information from the transmitted signal. The communication channel in this case is the Earth's atmosphere. FSO communication involving lasers is subject to a number of complications due to the non-ideal optical properties of the communication channel. More specifically, the laser signal will be attenuated by the atmosphere due to the presence of absorption, scintillation, scattering, propagation geometry, and other effects. The total radiation attenuation from the atmosphere can typically be calculated as [1]:

$$A(\lambda) = \alpha_{fog}(\lambda) + \alpha_{snow}(\lambda) + \alpha_{rain}(\lambda) + \alpha_{scattering}(\lambda), [dB/km]$$

where $\alpha_x(\lambda)$ is attenuation caused by the given weather condition and λ is the operational wavelength.

This attenuation occurs as the atmosphere is made up of various small particles and molecules (fog, dust, aerosols, etc.) which results in absorption, scattering, and scintillation. Fortunately, there are atmospheric scintillation windows where transmittance through the atmosphere is high. The four main windows to consider are the visible, near-infrared (NIR), mid-infrared (Mid-IR), and long wave infrared (LWIR). Each of these windows have relatively high optical transmittance, although there are various advantages and drawbacks to each window. It would be relatively simple to implement an FSO system based on the visible system if it were not for eye safety concerns due to the power of the lasers involved coupled with the ability of the human eye to focus visible light. As a result, the visible window is typically neglected in favor of the NIR, Mid-IR, and FIR bands. The human eye does not focus light greater than 1400 nm strongly, so it is possible to transmit using high-power optical signals that can help offset some of the attenuation effects.

One of the main factors to consider regardless of the wavelength used is scattering, which takes the form of Rayleigh and Mie scattering. Rayleigh scattering occurs when the light interacts with particles that are significantly smaller than the wavelength, and is characterized by a scattering cross-section:

$$\sigma_{Rayleigh} = \frac{8\pi^3 (n^2 - 1)^2}{3N^2 \lambda^4}$$

The most important feature to note is the $\lambda^{-4}$ dependency, which means that smaller wavelengths will scatter much more significantly than larger wavelengths. Fortunately, the NIR, MIR, and FIR bands have long enough wavelengths that Rayleigh scattering can typically be neglected versus Mie scattering. Mie scattering occurs when the particle size is within the same size as the wavelength. This form of scattering is not nearly as dependent on the wavelength as Rayleigh scattering, with a $\sim\lambda^{-1}$ scattering cross-section dependence that varies somewhat with wavelength. As we can see, it is still advantageous to prioritize the use of longer wavelengths to minimize scattering, which is a large source of attenuation with FSO signals. This brings us to the use of infrared signals for communication purposes, starting with the NIR band.

The NIR band (~800-1550 nm) has the advantage in that we have access to mature laser diodes and detectors for this band, in particular the 1300-1550 nm range due to the proliferation of telecommunications technology based fiber communication using these wavelengths. Many satellite communication systems have successfully utilized a 1550 nm laser diode-based system for ground-to-satellite and satellite-to-satellite communication. These systems have the benefit of being able to be modulated at extremely high speeds (>10 Gbps), allowing for large amounts of data to be sent during the limited time a low Earth orbit (LEO) satellite may be in range of the ground station. Unfortunately, even at this wavelength, there is significant attenuation from weather such as fog where the airborne particles are comparable in size to the wavelength, leading to heavy losses from Mie scattering. In extremely dense fog, it is possible to be limited to a maximum range of 500 meters, which is unacceptable for LEO communications that can take place over distances >400 km [2]. This results in a link availability as low as 10-40% for a single satellite and ground station, which can be unacceptable for certain missions. As a result, there is a desire to improve on the ability of the FSO link to mitigate atmospheric attenuation.

The Mid-IR band (3-5 microns) is a promising prospect for FSO communication, as it features significantly improved performance over the NIR and can even compare to the FIR band for certain weather conditions, as known by a person skilled in the art. While it is possible to generate Mid-IR light using QCLs, there is currently a lack of high speed and high power QCLs on the market. Other potential options such as holmium fiber lasers or interband cascade lasers suffer similar problems, being unable to target the 3-5 micron window effectively or lacking watt-level output power, respectively. A novel approach to nonlinear wavelength conversion for the generation of high power, high modulation speed MIR sources is currently being investigated by the research team. The present disclosure instead focuses on the LWIR atmospheric transmission window.

The LWIR band (8-12 microns) was ignored until the 1980's when quantum cascade lasers (QCLs) capable of emitting in the 8-10 micron range were developed, along with accompanying mercury cadmium telluride (HgCdTe) photodiodes. The benefits of such a system over NIR-based FSO systems is that Mie and Rayleigh scattering are significantly reduced for wavelengths in the FIR band. Additionally, the background radiation from the sun, earth, moon, etc. is significantly lower for this wavelength as well, leading to the potential for significantly higher signal-to-noise ratios. Unfortunately, adoption of communications involving QCLs in the FIR window has been limited due to the lack of affordable high-speed optical sources and detectors operating in this wavelength region [3]. However, the LWIR band shows favorably low attenuation over the NIR and MIR bands for moderate and heavy cloud and fog cover, which motivates the development of high speed and high power LWIR sources and receivers for optical satellite communication [4][5][6]. As a result, we look to novel methods of generating LWIR light. One such method is the use of orientation patterned semiconductors to generate LWIR light through the use of difference frequency generation. The orientation patterning process is comparable to the usage of ferroelectric domain engineering to produce periodically poled nonlinear crystals, such as periodically poled lithium niobate. The orientation patterning method involves growing a substrate of a semiconductor with a strong optical nonlinearity, such as gallium phosphide or gallium arsenide, and then depositing a thin layer of a group 4 element such as germanium or silicon. Then, a domain inverted crystal can be grown on top of the group IV element, and the resulting wafer can be etched with the desired poling pattern with a higher degree of precision than traditional ferroelectric domain engineering methods, thanks to modern electron beam lithography developments [7][8]. The use of orientation patterned semiconductors is required due to the limited transparency region of popular photonic crystals such as lithium niobate, which is only transparent from 0.4 to 5 microns. Gallium phosphide and gallium arsenide, on the other hand, both span the 1.4 to 12 micron region, allowing the generation of LWIR light. Another advantage of orientation patterned semiconductors is that the nonlinear optical coefficient that governs the efficiency of nonlinear wavelength conversion is anywhere from 2 to 5 times greater in OP-SCs versus ferroelectric crystals such as lithium niobate. This could lead to devices with much greater conversion efficiencies, or much more compact devices using OP-SCs with conversion efficiencies equal to their ferroelectric crystal counterparts.

As mentioned previously, the proposed transmitter uses difference frequency generation in an orientation patterned semiconductor to generate LWIR light. Difference frequency generation involves two input photons at angular frequencies ω1 and ω2 that are annihilated within the orientation patterned semiconductor order to generate one output photon of frequency ω3. This is a parametric process and so energy conservation is maintained. The output frequency can be determined with the following relation:

$$\hbar\omega_1 - \hbar\omega_2 = \hbar\omega_3$$

Using this process, it is possible to generate LWIR light with careful selection of the two input laser frequencies. The information is encoded on the transmitter via modulating one of the input lasers at wavelength λ2 or frequency ω2, which will typically consist of a telecommunications band 1550 nm laser diode modulated at >1 Gbps speeds. In this application, the pump laser would likely be a Nd:YAG or Nd:YVO4 crystal emitting in the 1320-1340 nm band, which is a well-known but less used wavelength over the more common 1064 nm transition associated with such diode pumped solid state lasers.

The proposed detector is very similar in structure to the DFG based transmitter, except the DFG orientation patterned semiconductor has now been replaced with a sum frequency generation (SFG) OP-SC. The relation for SFG is very similar to the DFG relation, except this time the sum of the two input angular frequencies provides an output photon (which is familiar to a person skilled in the art):

$$\hbar\omega_1 + \hbar\omega_2 = \hbar\omega_3$$

This allows us to convert the incoming MIR light transmitted from the satellite to the 1320 nm band telecom wavelength range where high-sensitivity, high-speed detectors are commercially available. This conversion allows us to avoid one of the major problems with using LWIR light, which is finding affordable detectors with a suitable speed and sensitivity.

In addition to the proposed transmitter and receiver, the present disclosure also describes a structure for efficient backwards optical parametric oscillation. This structure, utilizing the same orientation patterned semiconductors mentioned previously, enables highly efficient tunable optical radiation over a wide wavelength range. The distinction between a forward and backward three wave mixing is explained in the following. In order for nonlinear optical processes to proceed in an efficient manner, the phase matching of the various wavelengths involved in the nonlinear processes must be perfect. In a forward three wave mixing, there is a pump, signal, and idler wavelength, where the pump and signal are typically provided and the idler is produced through either difference frequency generation or sum frequency generation. Due to the refractive index of the nonlinear medium varying with wavelength, there will be a momentum mismatch between the three waves, typically denoted Δk:

$$\Delta k = k_p - k_s - k_i$$

where the pump, signal, and idler are all travelling in the same horizontal direction. In order for perfect phase matching to be achieved, it is required that the momentum mismatch be zero (Δk=0). This is typically accomplished through the introduction of a periodic structure in the nonlinear medium in order to establish quasi-phase matching. The periodic structure serves to compensate for the momentum mismatch, allowing efficient nonlinear wavelength conversion. The additional momentum of the poled nonlinear medium is typically represented by $$\Delta k_{medium} = \frac{2\pi m}{\Lambda},$$

where m is an integer representing the order of phase matching (typically first order, m=1) and Λ is the period of the nonlinear medium, typically in microns. In a backwards three wave mixing, one of the beams (typically the idler) travels in the opposite direction, leading to a momentum mismatch of [9][10]:

$$\Delta k = k_p - k_s + k_i$$

The phase matching concept remains the same, but now the momentum provided by the nonlinear medium must be larger, meaning the required period is significantly smaller. This can pose an issue for ferroelectric crystals that are poled via ferroelectric domain engineering (FDE), as the first order phase matched period for LWIR generation would be on the order of sub-micron, which is hard to achieve in the FDE. This can be compensated for by using higher order phase matching, however higher order phase matching leads to significantly lower conversion efficiencies. The benefit of the proposed orientation patterned semiconductor structure is that modern semiconductor photolithography and etching techniques have resolutions on the order of nanometers, allowing the fabrication of nonlinear periodic semiconductors with periods small enough for first order phase matching. To the best of our knowledge, this would be the first practical demonstration of a first order phase matched backwards three wave mixing. The backwards three wave mixing can be fabricated without the use of mirrors, leading to greatly simplified optical system design [9][10]. One potential implementation of this backwards three wave mixing utilizing orientation patterned semiconductors is presented in the provided figures.

Now that the general overview of the physics behind the devices described herein have been discussed, various example implementations presented in the figures will be explained in detail.

Figure 1:
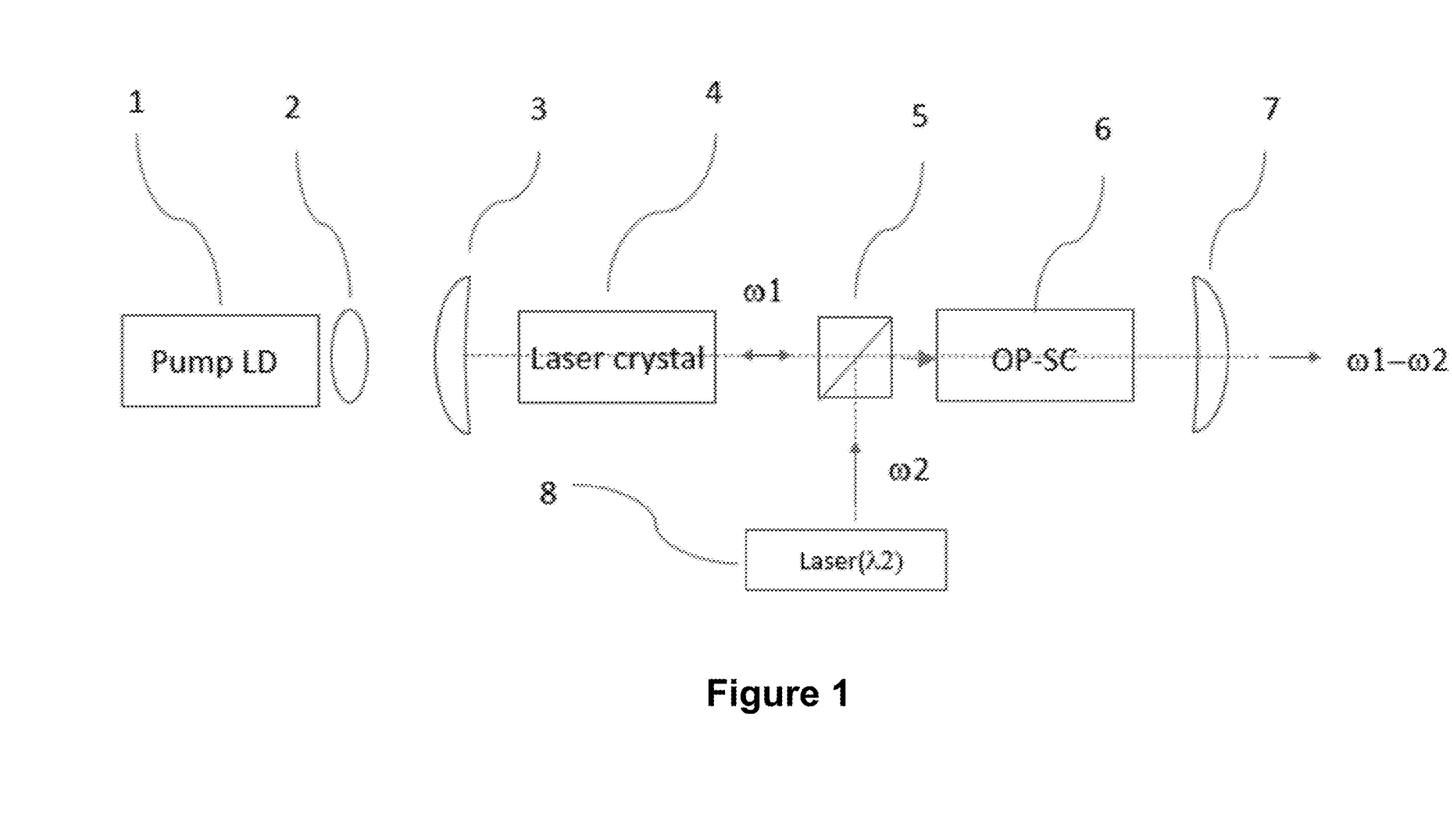

FIG. 1 is a diagram illustrating an example transmitter design. This design consists of a pump diode 1 (Ex: 808 nm), focused by a fast-axis collimating lens 2 onto an optically pumped laser diode 4 (Ex: Nd:YAG 1338 nm crystal). A second laser 8 is the high-speed modulated source (an erbium doped fiber amplified [EDFA] 1550 nm laser diode modulated at >1 Gbps) onto which the information to transmit is encoded. Both lasers are then coupled into the DFG orientation patterned semiconductor 6 through the use of a beam combiner 5. The laser cavity consists of two mirrors 3 and 7, which confine the first laser beam at wavelength λ1 (e.g. 1338 nm) completely within the laser cavity, and the output power of the transmitter is determined by the Q-factor of the intracavity design as well as the output power of the two input lasers.

Figure 2:
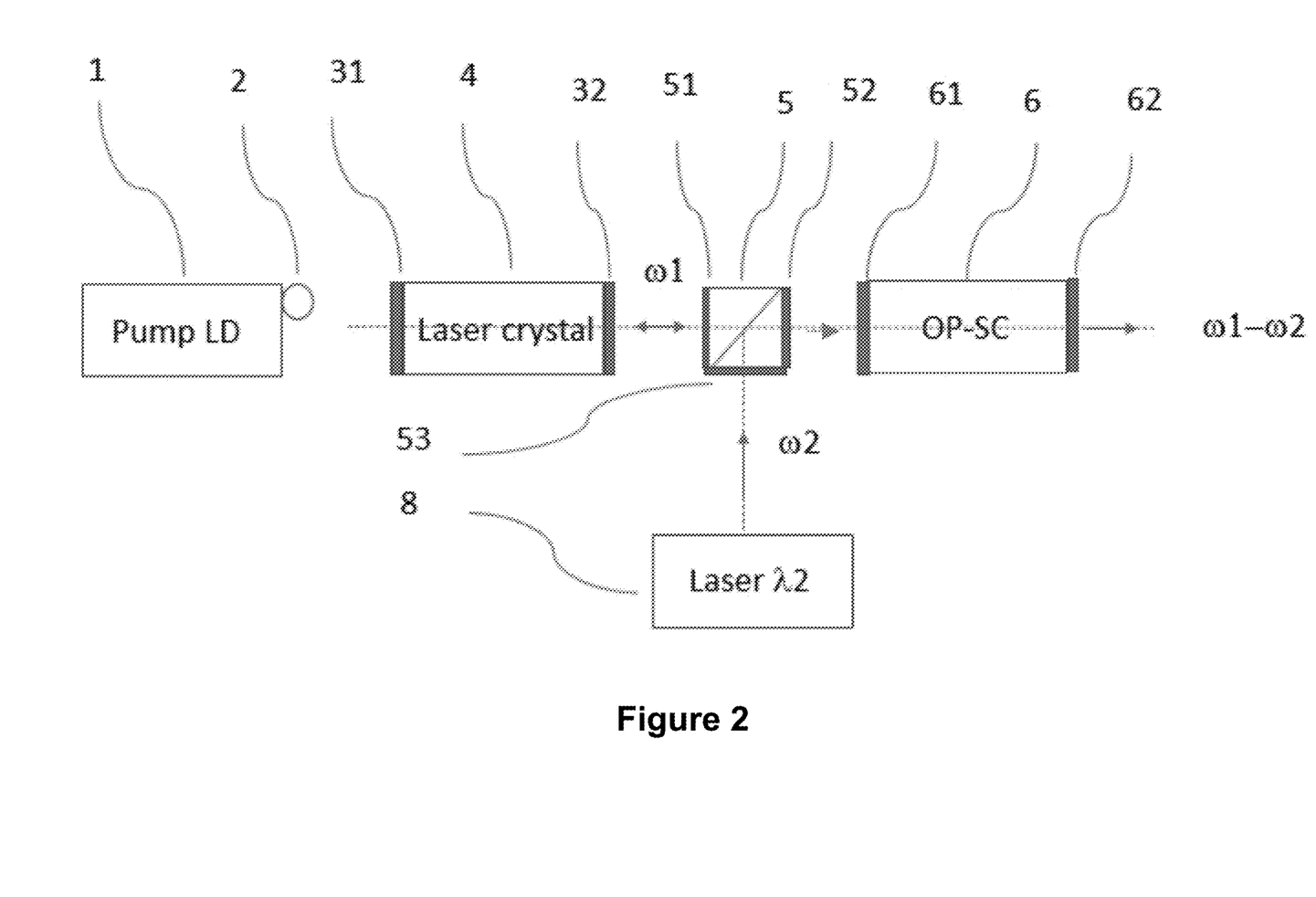
FIG. 2 shows the same structure as shown in FIG. 1, but now the laser crystal, orientation patterned semiconductor 6, and beam combiner 5 have had high-reflection and anti-reflection coatings applied to improve the performance of the structure. The purpose of the coatings is discussed further below.

FIG. 2 has a similar structure to FIG. 1, except the performance of the system has been optimized through the addition of various high-reflection and anti-reflection coatings. In this case, the laser crystal 4 is coated with a high-transmission coating at the pump diode wavelength λ0, as well as a high-reflection coating 31 for the output wavelength λ1 at the input facet, while the output facet features an anti-reflection coating 32 for the second laser wavelength λ2. The DFG orientation patterned semiconductor has an input facet 61 coated with an anti-reflection coating at λ1 and λ2, as well as a high-reflection coating at λ0 and $$\lambda 3 = \frac{1}{\frac{1}{\lambda_1} - \frac{1}{\lambda_2}},$$

where λ3 is the output light generated via DFG. The output facet 62 features a high-reflection coating at λ1, and probably λ2, as well as a high-transmission coating for λ3. The high-reflection coatings serve as the cavity mirrors 3,7 in FIG. 1. Finally, the beam combiner has an input facet 51 coated with an anti-reflection coating at an output facet along the direction of the laser cavity axis 52 coated with an anti-reflection coating at λ1 and λ2, and has an input facet perpendicular to the laser cavity axis 53 with an anti-reflection coating at λ2.

Figure 3:
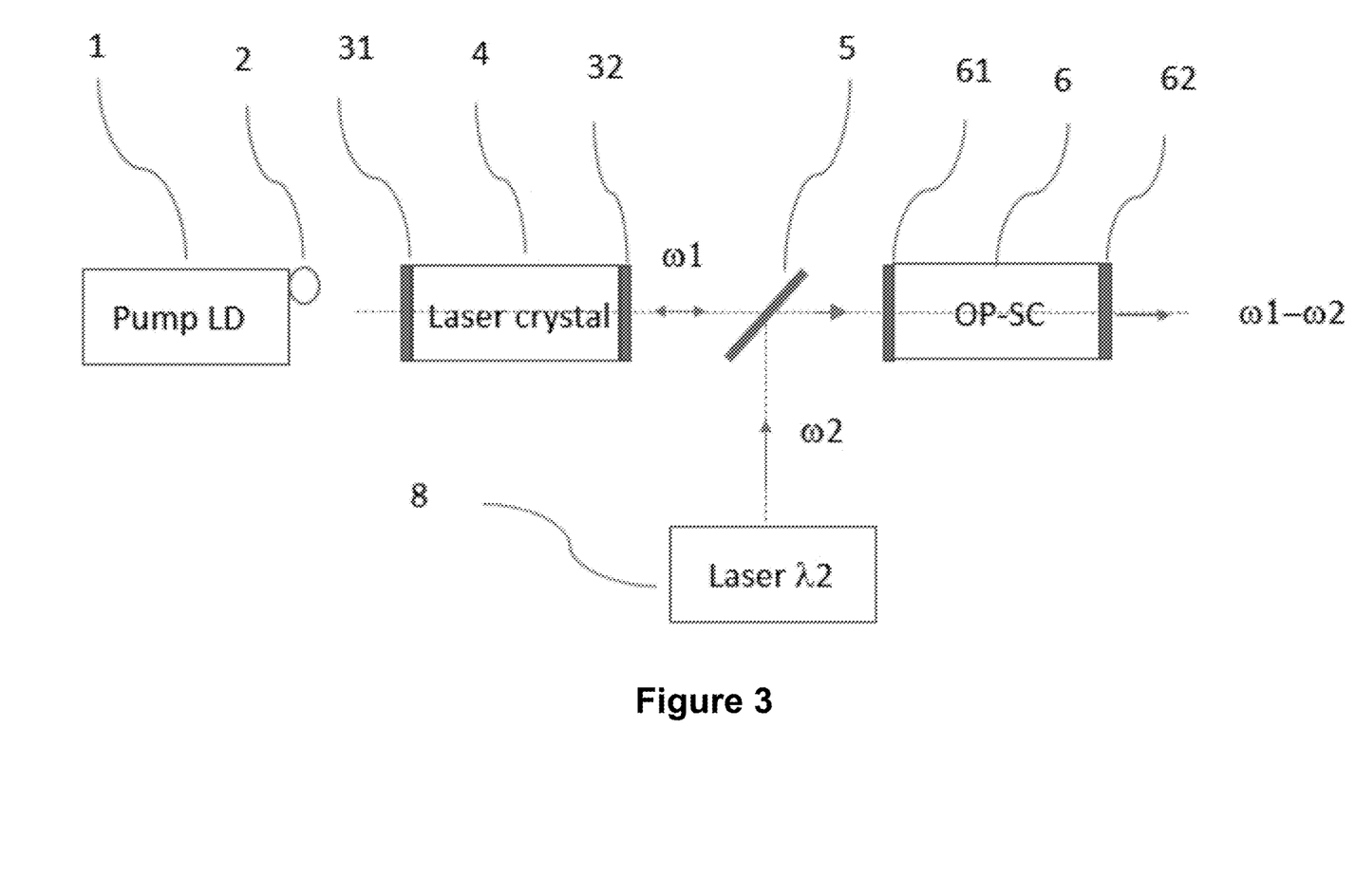
FIG. 3 shows the device in FIG. 2, except the beam combiner has been replaced by a dichroic mirror 5, which has nearly zero loss at λ1 and high reflection at λ2.

FIG. 3 illustrates another potential transmitter design that is almost identical to FIG. 2, except the beam combiner has been replaced with a dichroic mirror 5 that has nearly zero loss at λ1 and high reflection at λ2. Additionally, all transmitter designs feature an input laser λ2 that is a tunable laser with narrow linewidth, or a modulated high-power laser from a seed laser diode and an optical amplifier (which may be an EDFA or other relevant optical amplifier).

Figure 4:
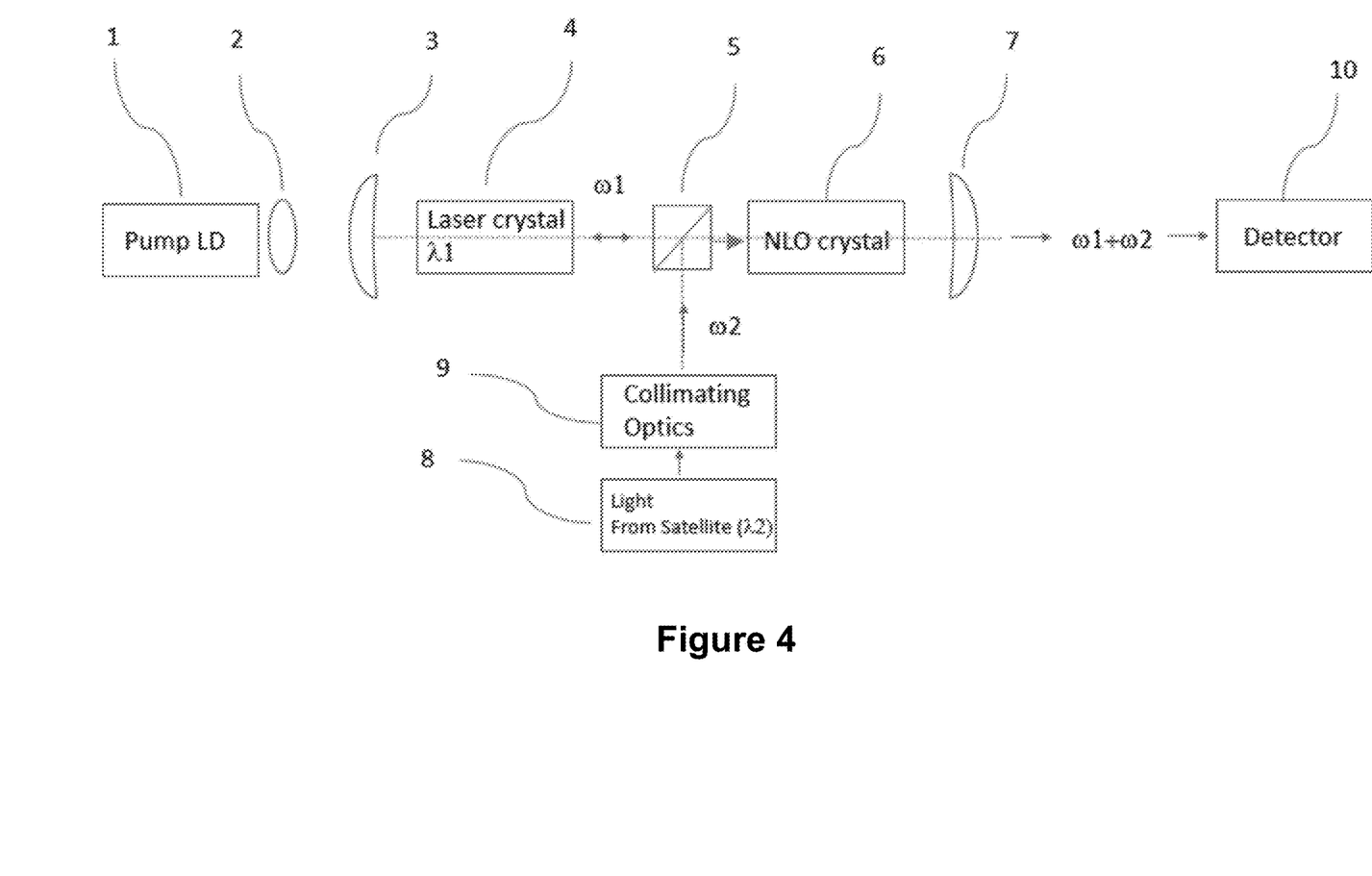

FIG. 4 is a diagram illustrating an example receiver design. This design consists of a pump diode 1 (Ex: 808 nm), focused by a fast-axis collimating lens 2 onto an optically pumped laser diode 4 (Ex: Nd:YVO4 1342 nm crystal). The second laser input from the transmitter design has been replaced with the input LWIR light from the satellite or high-altitude communications platform 8. This light is then collimated to a beam size of less than 100 microns via the attached collimating optics 9, which will typically consist of a receiver Cassegrain-style telescope to collect the light followed by a series of optical filters, polarization controllers, and collimators to simulate a second laser. Both lasers are then coupled into the SFG orientation patterned semiconductor 6 through the use of a beam combiner 5. The laser cavity consists of two mirrors 3 and 7, which confine the first laser beam at wavelength λ1 (e.g. 1342 nm) completely within the laser cavity, and the output power of the transmitter is determined by the Q-factor of the intracavity design as well as the output power of the two input lasers. The output of the SFG crystal is then focused onto a detector 10 which may consist of a high speed telecom band receiver or any other commercially available detector with suitable sensitivity and speed.

Figure 5:
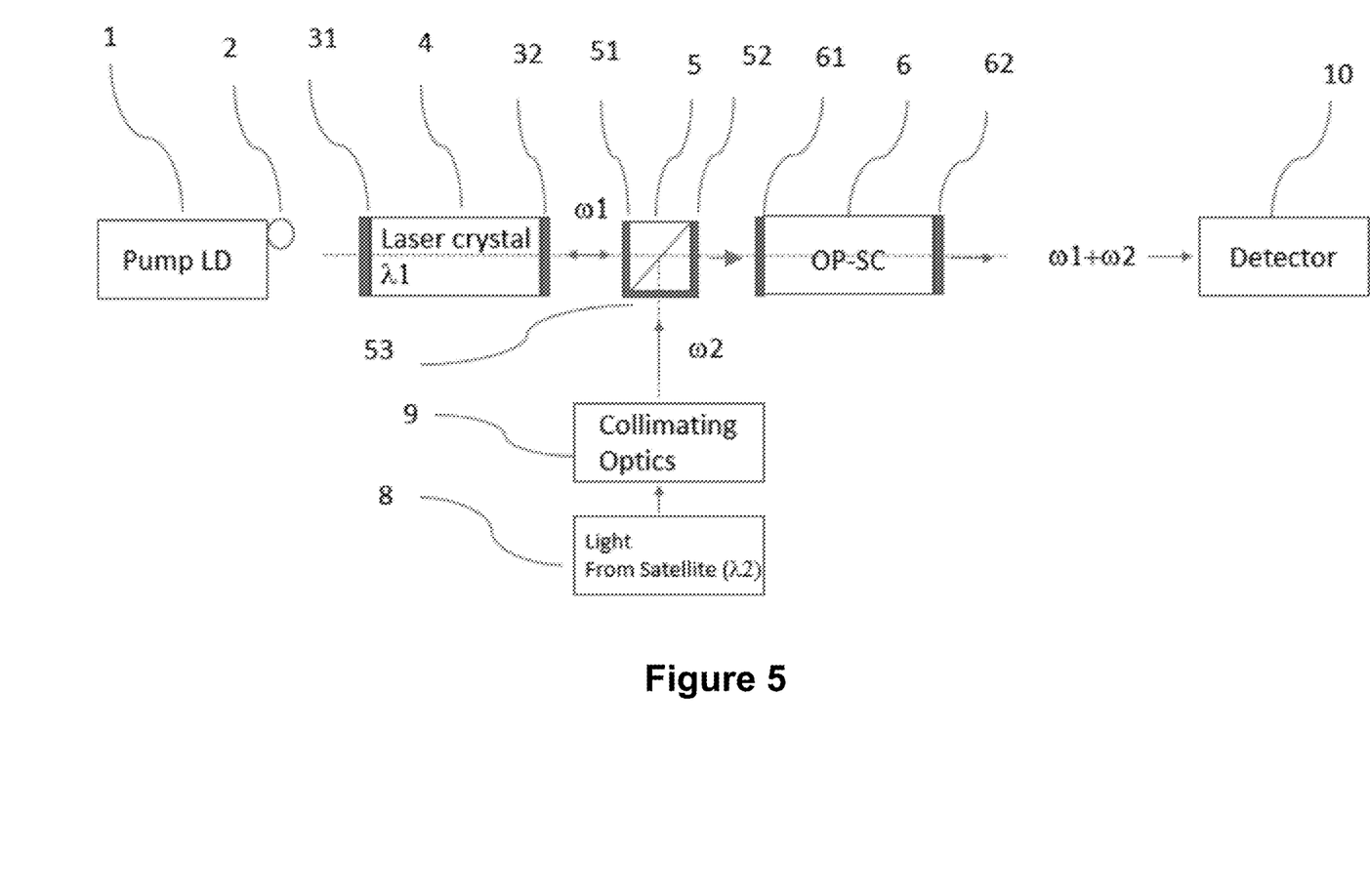
FIG. 5 shows the same structure as shown in FIG. 4, but now the laser crystal 4, orientation patterned semiconductor 6, and beam combiner 5 have had high-reflection and anti-reflection coatings applied to improve the performance of the structure. The purpose of the coatings is discussed in the detailed description.

FIG. 5 is a similar structure to FIG. 4, except the performance of the system has been optimized through the addition of various high-reflection and anti-reflection coatings. In this case, the laser crystal 4 is coated with a high-transmission coating at the pump diode wavelength λ0, as well as a high-reflection coating for the output wavelength $\lambda 1$ at the input facet 31, while the output facet 32 features an anti-reflection coating for $\lambda 1$. The SFG orientation patterned semiconductor has an input facet 61 coated with an anti-reflection coating at $\lambda 1$ and $\lambda 2$. The output facet 62 features a high-reflection coating at $\lambda 1$, and probably $\lambda 2$, as well as a high-transmission coating for $\lambda 3$. The high-reflection coatings serve as the cavity mirrors 3,7 in FIG. 4. Finally, the beam combiner has an input facet 51 coated with an anti-reflection coating at $\lambda 1$, an output facet along the direction of the laser cavity axis 52 coated with an anti-reflection coating at $\lambda 1$ and $\lambda 2$, and has an input facet perpendicular to the laser cavity axis 53 with an anti-reflection coating at $\lambda 2$. The detector 10 remains the same as the detector described in FIG. 4.

Figure 6:
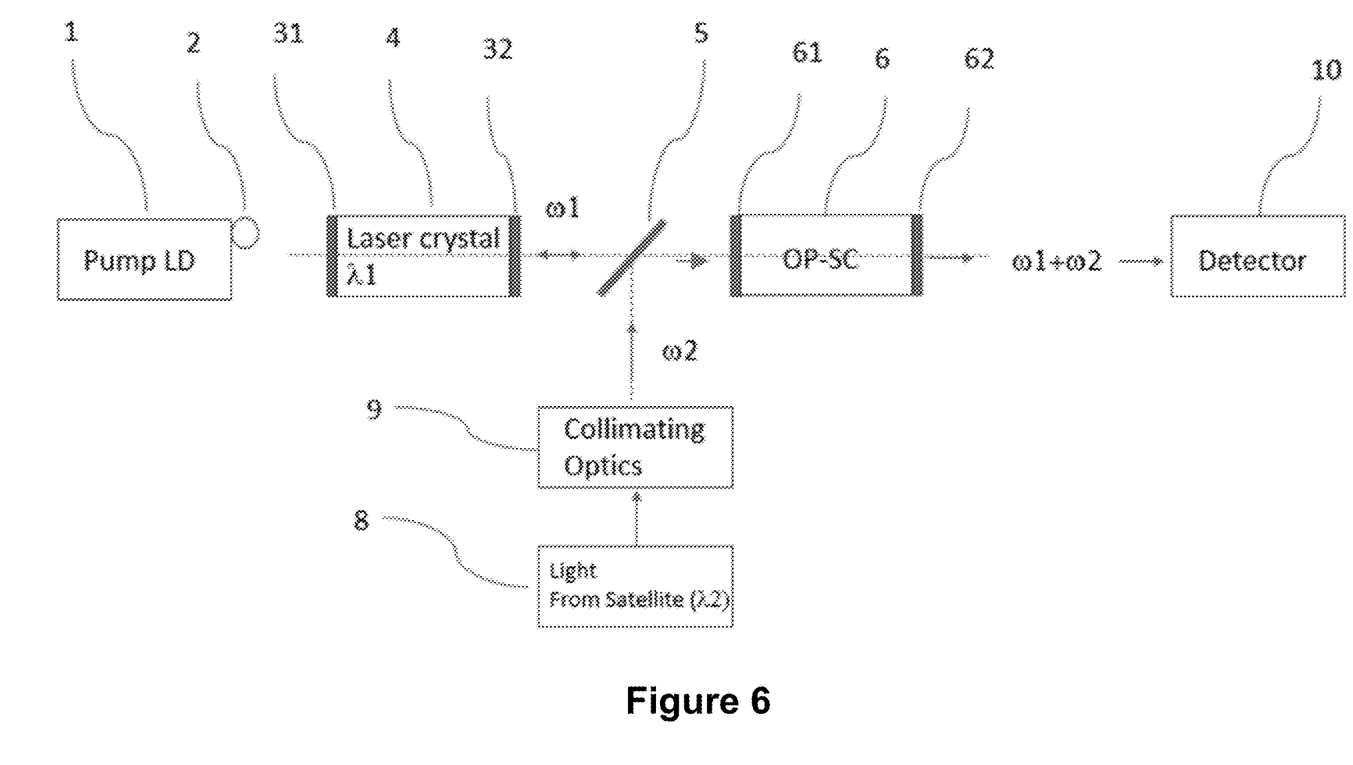
FIG. 6 shows the device in FIG. 5, except the beam combiner has been replaced by a dichroic mirror 5, which has nearly zero loss at λ1 and high reflection at λ2.

FIG. 6 illustrates another potential receiver design that is almost identical to FIG. 5, except the beam combiner has been replaced with a dichroic mirror 5 that has nearly zero loss at $\lambda 1$ and high reflection at $\lambda 2$. The detector 10 remains the same as the detector described in FIG. 4.

Figure 7:
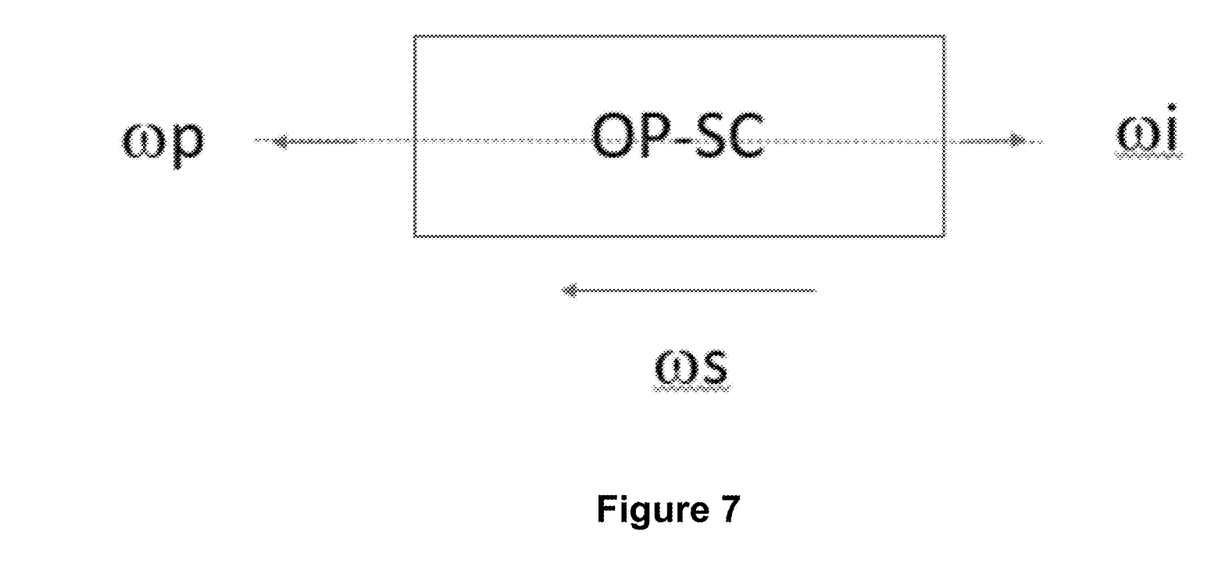

FIG. 7 illustrates the direction of the pump, signal, and idler wavelengths with respect to the orientation patterned semiconductor (OP-SC) in the backwards three wave mixing design. In the figure, the pump has angular frequency $\omega p$, the signal $\omega s$, and the idler $\omega i$. It is important to note that while the idler is shown in the figure as the backward propagating wavelength, it is possible for the signal or pump to be the backwards travelling wave relative to the other two wavelengths. The idler is used here simply due to it being the most common notation among those skilled in the art.

Figure 8:
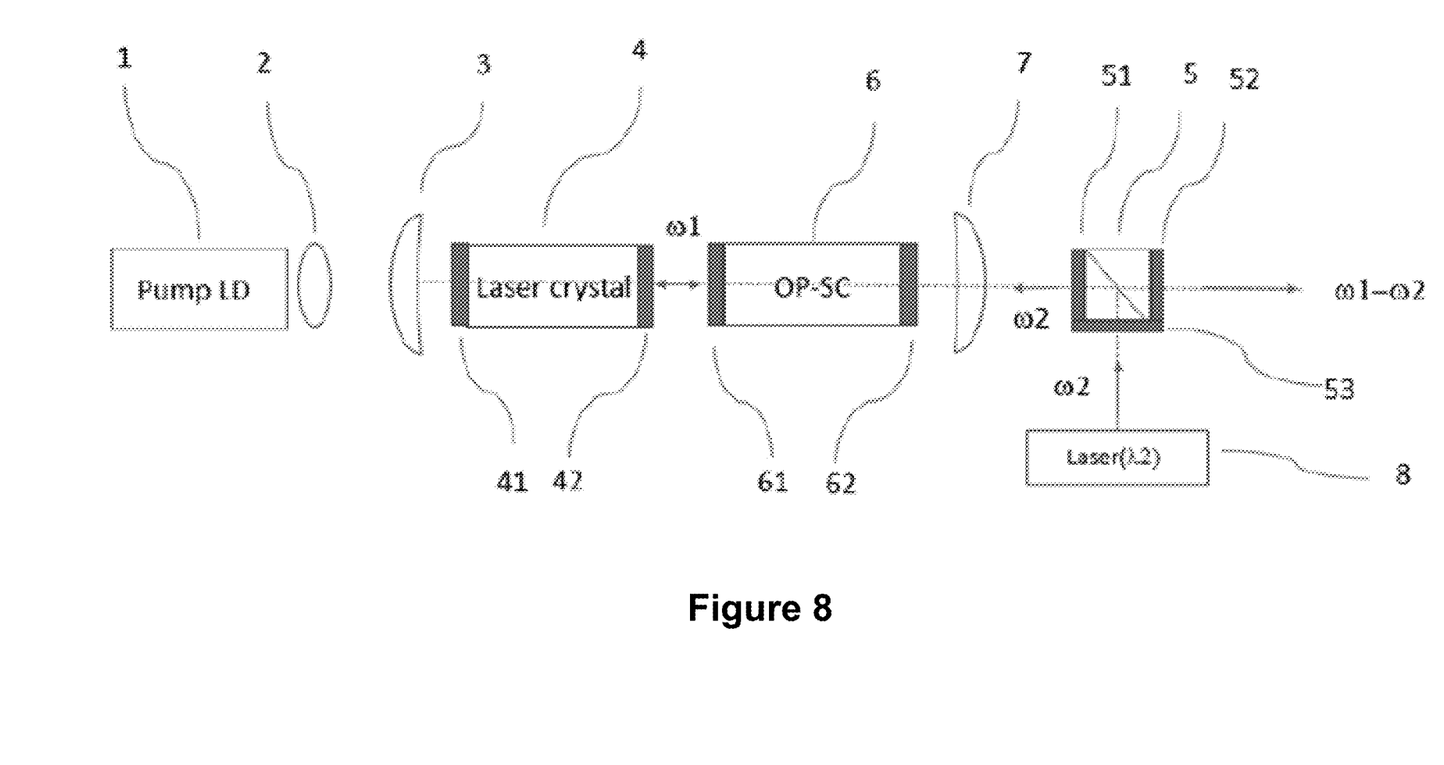

FIG. 8 is a backwards three wave mixing structure for difference frequency generation similar to FIG. 1, except the performance of the system has been optimized through the addition of various high-reflection and anti-reflection coatings. Additionally, the signal laser emitting at wavelength $\lambda 2$ and the beam combiner are located outside of the laser cavity. This is done in order to minimize the total intracavity loss that the beam combiner would introduce, increase the attainable intracavity power and thus increasing the total conversion efficiency. In this case, the laser crystal 4 is coated with a high-transmission coating at the pump diode wavelength $\lambda 0$ and high reflection coating at $\lambda 1$ at the input facet 41, while the output facet 42 features an anti-reflection coating for $\lambda 1$. The DFG orientation patterned semiconductor has an input facet 61 coated with an anti-reflection coating at $\lambda 1$. The output facet 62 features a high reflective coating at $\lambda 1$ and an anti-reflection coating at $\lambda 2$, and $$\frac{1}{\frac{1}{\lambda_1}-\frac{1}{\lambda_2}}.$$

The laser cavity consists of two mirrors 41 and 62, which confine the first laser beam at wavelength $\lambda 1$ (e.g. 1338 nm) completely within the laser cavity, and the output power of the backwards three wave mixing is determined by the Q-factor of the intracavity design as well as the output power of the pump and signal lasers. Finally, the beam combiner has an input facet 51 coated with an anti-reflection coating at $\lambda 2$ and $$\frac{1}{\frac{1}{\lambda_1}-\frac{1}{\lambda_2}},$$

an output facet 52 along the direction of the laser cavity axis coated with an anti-reflection coating at $$\frac{1}{\frac{1}{\lambda_1}-\frac{1}{\lambda_2}},$$

and has an input facet 53 perpendicular to the laser cavity axis with an anti-reflection coating at $\lambda 2$.

Figure 9:
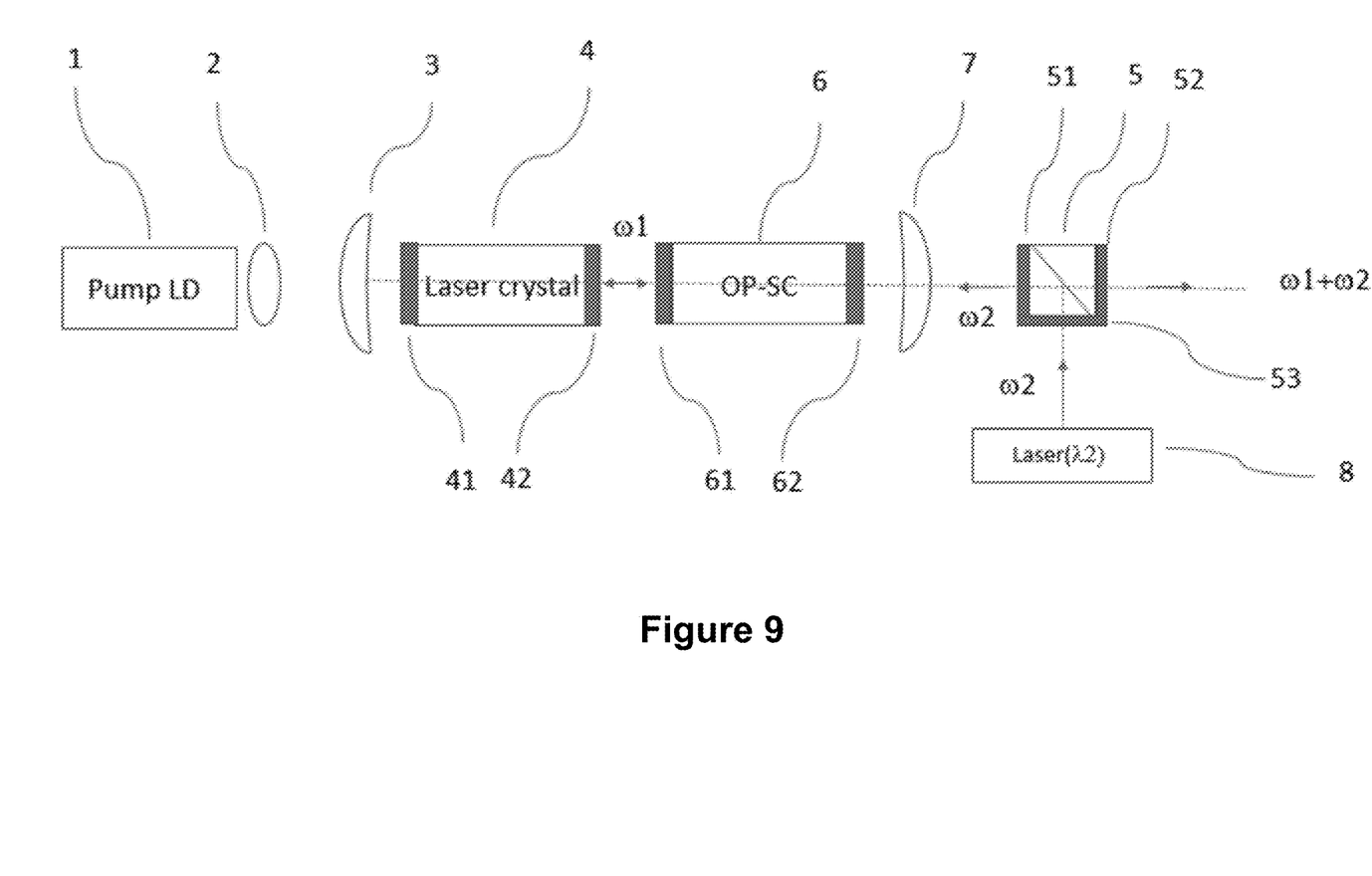

FIG. 9 is almost identical to the backwards three wave mixing structure presented in FIG. 8, except the orientation patterned semiconductor has been designed for sum frequency generation instead of difference frequency generation. As a result, all anti-reflection coatings that target the difference frequency generation wavelength $$\frac{1}{\frac{1}{\lambda_1}-\frac{1}{\lambda_2}}$$

in FIG. 8 instead target the sum frequency generation wavelength $$\frac{1}{\frac{1}{\lambda_1}-\frac{1}{\lambda_2}}.$$

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The term "and/or" as used herein means that the listed items are present, or used, individually or in combination. In effect, this term means that "at least one of" or "one or more" of the listed items is used or present.

While the present application has been described with reference to examples, it is to be understood that the scope of the claims should not be limited by the embodiments set forth in the examples but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

CITATIONS FOR DOCUMENTS REFERRED TO IN THE APPLICATION

| Publication Number | Priority Date | Publication Date | Assignee | Title |
|---|---|---|---|---|
| CN102324962B | 2011 May 31 | 2012 Jan. 18 | Guo Haichao et al. | Method for capturing, tracking and processing satellite optical communication |
| U.S. Pat. No. 5,923,452A | 1996 Oct. 16 | 199-07-13 | Green Wireless LLC | Laser satellite communication system |
| US20120281741A1 | 2005 Aug. 3 | 2012 Nov. 8 | Feher Kamilo | Ship Based Cellular and Satellite Communication |
| US20020181059A1 | 2000 Nov. 7 | 2002 Dec. 5 | Paul Christopher | Broadband communication for satellite-ground or air-ground links |
| EP0989692B1 | 1998 Sep. 21 | 2006 Jul. 26 | Oerlikon Space AG | Apparatus for controlling the beam direction in a laser satellite communication system |
| EP1097530B1 | 1997 Dec. 12 | 2006 May 31 | ITT Manufacturing Enterprises | Laser satellite communication systems |
| EP0054582B1 | 1980 Dec. 23 | 1986 Mar. 19 | International Business Machines Corp | Communication system in which data are transferred between terminal stations and satellite stations by infrared signals |
| CN104410463A | 2014 Nov. 25 | 2015 Mar. 11 | Li Xiangyang et al. | Method and system for laser communication on basis of quantum cascade laser |
| CN106533562A | 2016 Nov. 30 | 2017 Mar. 22 | Zhou Bilei et al. | Spatial multiuser multi-system satellite laser communication system and method |
| US20040208602A1 | 2001 Dec. 1 | 2004 Oct. 21 | James Plante | Free space optical communications link tolerant of atmospheric interference |
| U.S. Pat. No. 5,333,142A | 1992 Oct. 26 | 1994 Jul. 26 | US Secretary of Navy | Technique for intracavity sum frequency generation |
| US20010012142A1 | 1995 Feb. 28 | 2001 Aug. 9 | Green Wireless LLC | Laser satellite communication system |
| U.S. Pat. No. 9,086,609B1 | 2012 Apr. 25 | 2015 Jul. 21 | Yan et al. | Mirrorless-oscillation in a waveguide using non-degenerate four-wave mixing |

PAPER REFERENCES

[1] Janusz Mikolajczyk et al. "Analysis of Free-Space Optics Development". *Metrology and Measurement Systems*. Vol. 24, No. 4, pp. 653-674. 2017.

[2] Md. Nur Islam and Md Nur Al Safa Bhuiyan. "Effect of Operating Wavelengths and Different Weather Conditions on Performance of Point-to-Point Free Space Optical Link". *International Journal of Computer Networks & Communications (IJCNC)*. Vol. 8, No. 2. March 2018.

[3] E. Leitgeb et al. "Analysis and Evaluation of Optimum Wavelengths for Free-Space Optical Transceivers". *International Conference on Transparent Optical Networks (ITCON)*. 2010.

[4] C. Chen, "Attenuation of Electromagnetic Radiation by Haze, Fog, Clouds, and Rain", *Rand Corporation*, Santa Monica, 1975.

[5] L. Carrier, G. Cato and K. von Essen, "The Backscattering and Extinction of Visible and Infrared Radiation by Selected Major Cloud Models", *Applied Optics*, vol. 6, no. 7, p. 1209, 1967. Available: 10.1364/ao.6.001209.

[6] A. Arnulf, J. Bricard, E. Curé and C. Véret, "Transmission by Haze and Fog in the Spectral Region 0.35 to 10 Microns", *Journal of the Optical Society of America*, vol. 47, no. 6, p. 491, 1957. Available: 10.1364/josa.47.000491.

[7] C. Lynch et al. "Growth of mm-thick orientation-patterned GaAs for IR and THZ generation". *Journal of Crystal Growth*, vol. 310. 2008.

[8] Sinji Koh et al. "GaAs/Ge/GaAs Sublattice Reversal Epitaxy on GaAs (100) and (111) Substrates for Nonlinear Optical Devices". *Japanese Journal of Applied Physics*, vol. 2, pp. 508-511. May 1999.

[9] Citlali E. Minor and Roger S. Cudney. "Mirrorless optical parametric oscillation in bulk PPLN and PPLT: a feasibility study". *Appl. Phys. B.* 2017. doi: 10.1007/s00340-016-6602-x

[10] Canalias, C., Pasiskevicius, V. "Mirrorless optical parametric oscillator". *Nature Photon* 1, 459-462 (2007). https://doi.org/10.1038/nphoton.2007.137

What is claimed is:

1. An optical receiver that converts incoming laser light to a new wavelength, the optical receiver comprising:
    a pumping laser diode with a fast axis compressing lens generating long wave infrared (IR) light having a pumping wavelength I0, operating in a continuous wavelength (CW) mode;
    collimating optics to reduce a beam size of incoming light from a second laser, output light from the collimating optics having a wavelength I2;
    a laser cavity comprising:
        a laser crystal receiving the long wave infrared light from the pumping laser diode, output light from the laser crystal having a lasing wavelength I1;
        a sum frequency generation orientation patterned semiconductor to generate near-IR light that can be detected by a photodetector; and
        a dichroic mirror or a beam combiner disposed between the laser crystal and the sum frequency generation orientation patterned semiconductor to receive the output light from the laser crystal and the output light from the collimating optics, output light from the dichroic mirror or the beam combiner being directed to the sum frequency generation orientation patterned semiconductor to generate the near-IR light; and
    a detector to receive the near-IR light generated from the sum frequency generation orientation patterned semiconductor, the detector being positioned outside of the laser cavity.

2. The optical receiver of claim 1, wherein the detector is a telecom photodiode.

3. The optical receiver of claim 1, wherein the detector is a heterodyne detector.

4. The optical receiver of claim 1, wherein the detector is a silicon avalanche photodiode.

5. The optical receiver of claim 1, wherein the laser crystal comprises:
    an input facet coated with a high transmission coating at I0 and a high reflective coating at I1; and
    an output facet coated with an anti-reflective coating at I1.

6. The optical receiver of claim 1, wherein the laser cavity includes the dichroic mirror.

7. The optical receiver of claim 1, wherein the laser cavity includes the beam combiner, the beam combiner comprising:
    a first input facet having an anti-reflective coating at I1 and a high reflective coating at I0 in a direction along the direction of the laser cavity axis;
    a second input facet having an anti-reflective coating at I2 in a direction perpendicular to a laser cavity axis; and
    an output facet having an anti-reflective coating at I0 and I2 along the direction of the laser cavity axis.

8. The optical receiver of claim 1, wherein the sum frequency generation orientation patterned semiconductor comprises:
    an input facet coated with an anti-reflective coating at I1 and I2; and
    an output facet coated with a high reflective coating at I1 and a high transmission coating at $1/(1/I1+1/I2)$.

9. The optical receiver of claim 1, wherein the sum frequency generation orientation patterned semiconductor comprises:
    an input facet coated with an anti-reflective coating at I1 and I2 and a high reflective coating at I0 and $1/(1/I1+1/I2)$; and
    an output facet coated with a high reflective coating at I1 and I2 and a high transmission coating at $1/(1/I1+1/I2)$.

* * * * *